(No Model.) 2 Sheets—Sheet 2.
F. WYNNE.
PNEUMATIC TIRE.
No. 594,310. Patented Nov. 23, 1897.
Fig. 5.     Fig. 4.     Fig. 6.
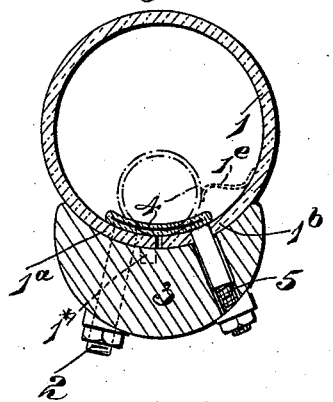 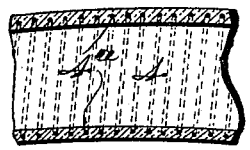 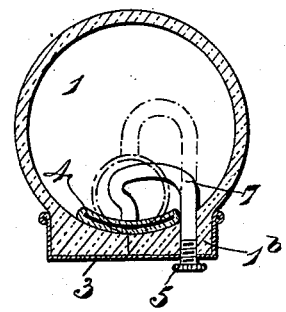
Fig. 7.     Fig. 8.     Fig. 9.
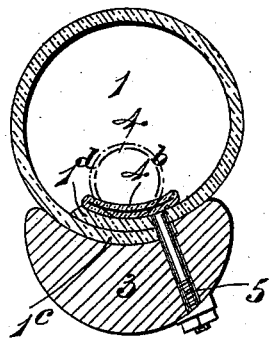 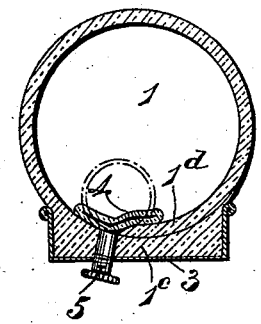 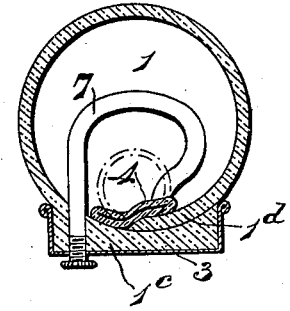
Fig. 10.     Fig. 11.
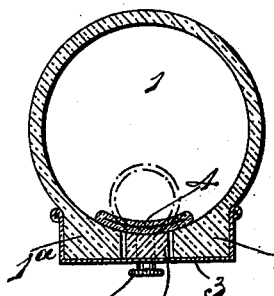 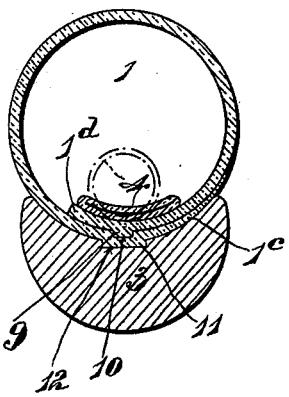
Fig. 12.
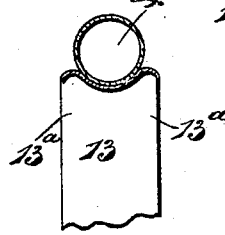
Witnesses.
Geo. E. Fuchs
James W. Bevans
Inventor,
Frank Wynne,
by Pattison Nesbit
Attys.

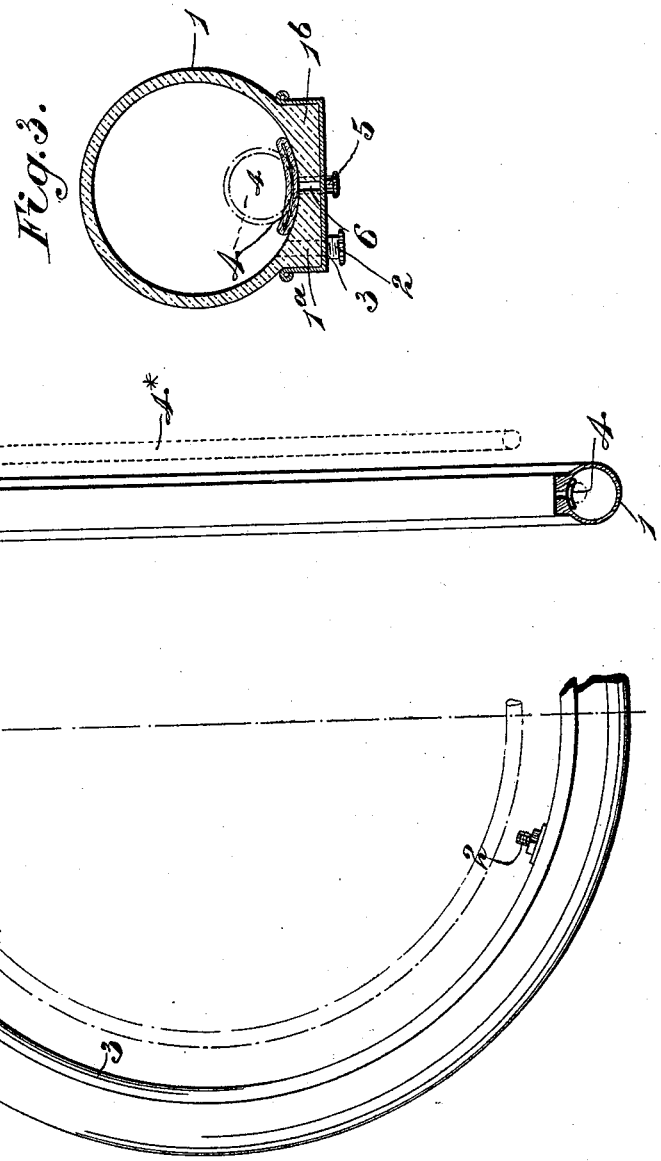

UNITED STATES PATENT OFFICE.

FRANK WYNNE, OF LONDON, ENGLAND.

PNEUMATIC TIRE.

SPECIFICATION forming part of Letters Patent No. 594,310, dated November 23, 1897.

Application filed January 5, 1897. Serial No. 618,054. (No model.)

*To all whom it may concern:*

Be it known that I, FRANK WYNNE, a subject of the Queen of Great Britain and Ireland, residing at Westminster, London, England, have invented Improvements in or Relating to Pneumatic Tires, of which the following is a specification.

This invention has reference to improvements in pneumatic tires of the kind which consists of a hollow inflatable ring of flexible material having a division or lap-joint all around its inner circumference, so that it can be opened or turned inside out for the purpose of gaining access to its inner surface for the purpose of easily repairing the same in the event of its becoming perforated or otherwise damaged.

My invention has for its object to enable an air-tight joint to be made at or around the division or lapped joint in a more effective manner than heretofore and so that the joint can be more easily made and broken than usual with such tires. For this purpose an air-tight joint is made all around the inner circumference of the hollow tire (hereinafter called the "tire-ring") where the annular division or annular lapped joint occurs by means of a hollow or tubular pneumatic sphincter grip-ring, the tube of which is of smaller cross-section than that of the interior of the tire-ring and is made of elastic material, this sphincter grip-ring being provided with an air-valve by which it can be inflated with air under pressure or deflated at will. This pneumatic sphincter grip-ring, when deflated and away from the tire, has an internal diameter less than that of the inner periphery of the tire-ring where the annular division or the annular lapped joint between the adjacent edge portions of the tire-ring occur, the arrangement being such that by inflation of the sphincter grip-ring with air under pressure its diameter can be increased to such an extent that it can be caused to encircle the said annular division or the annular lap-joint, that upon then deflating such ring it will close tightly all around the division or the lap-joint with a contractile or centripetal action, and so form an effective air-tight closure of the tire-ring and hold the tire-ring on the rim by its centripetal action, and that upon again inflating the sphincter grip-ring to a sufficient extent it can be caused to release the edge portions of the tire-ring and permit either or both of them to be withdrawn from the wheel-rim for the purpose of examining the interior of the tire-ring.

Pneumatic tires according to this invention can be constructed in various forms.

In the accompanying drawings, Figure 1 is a half side elevation, and Fig. 2 a vertical section, of a wheel-rim with pneumatic tire according to this invention. Fig. 3 shows the same wheel-rim and tire in cross-section, but to a larger scale. Fig. 4 shows in longitudinal section and to an enlarged scale part of a pneumatic sphincter grip-ring for use in a tire according to my invention. Figs. 5 to 11, inclusive, are cross-sections, drawn to a larger scale than Figs. 1 and 2, showing other constructions of pneumatic tires according to this invention. Fig. 12 shows in sectional elevation a modified construction of sphincter grip-ring.

Referring to Figs. 1 to 3, inclusive, 1 is the tire-ring with air-valve 2, 3 the wheel-rim, and 4 a hollow or tubular pneumatic sphincter grip-ring with air-valve 5. The tire-ring 1, which is made of canvas covered with rubber both inside and out, may advantageously be made in the form of an undivided tubular ring, in which a radial division 6 is cut all around its inner circumference. This construction of tire-ring has the advantage of leaving sharp inside edges on both sides of the radial division, but the said ring may be otherwise made—as, for example, in a similar manner to that in which the outer covers are made for a pneumatic tire having an inner air-tube, except that it must be made thoroughly air-tight and that the edge portions should be covered with smooth rubber on the inside to insure a good joint with the pneumatic sphincter grip-ring, or, in the case of a lapped joint, with each other, as hereinafter described. The edge portions of the tire-ring at each side of the division may be made with projecting or thickened parts $1^a$ $1^b$ of the form shown. A tire having a radial division, such as 6, all around its inner periphery is herein called a "division-tire." The wheel-rim 3 is shown as of metal, formed on its outer side with the usual groove or trough, in which are fitted, as shown, the projections or thickened parts $1^a$ $1^b$ of the tire-ring, these parts being supported in position by the rim. In placing the tire-ring within the wheel-rim I usually prefer to leave only a narrow radial opening or division 6 between the edges of the said thickened parts.

The pneumatic sphincter grip-ring 4 has normally a diameter considerably less than that of the tire-ring 1, as shown in dotted lines at $4^\times$ in Figs. 1 and 2. It is so constructed that by inflating it with air under pressure its diameter can be increased sufficiently to enable it to be inserted within the tire-ring, so as to surround the division 6 therein, as shown in dotted lines in Figs. 2 and 3. Then upon placing the tire-ring within the wheel-rim 3 and deflating the sphincter grip-ring the latter will contract all around the division 6 and closely embrace it, as shown in full lines in Fig. 3, so as to make an air-tight joint at this part and hold the tire with a contractile or centripetal force on the wheel-rim. The tire-ring 1 can then be inflated by its air-valve 2, the air-pressure in the tire-ring serving to assist in making a tight joint and to hold the tire in place on the wheel-rim. The sphincter grip-ring need not be completely deflated. Sometimes I deflate it completely only after inflating the tire-ring. The inflation of the tire-ring *ceteris paribus* tends to deflate the sphincter grip-ring.

As the circumference of the tube of a sphincter grip-ring such as described will when inflated with air under pressure have a tendency to increase in a greater proportion than the circumference of the ring formed by such tube, I prefer to construct the tube in such a way as to limit its circumferential expansion without affecting or unduly affecting its longitudinal expansion. This may conveniently be done by wrapping, lining, or including in the material of which the tube is made a fabric, such as elastic webbing, of which one set of threads, say the weft-threads arranged to extend circumferentially around the tube, are of inelastic or of less extensible material or are so woven as to be less extensible than the other set of threads, say the warp-threads, which are of extensible or elastic material or of material so woven as to readily admit of the desired lengthwise extension of the tube and consequent increase in the diameter of the ring formed by the tube; or the same result may be attained by providing a tube of rubber with circumferential supports of suitable material, such as threads, ribbons, or thin flexible metal arranged spirally or in the form of parallel rings on or in the substance of the tube, so that they will limit the expansion of the circumference of the tube while facilitating that of the ring formed by the tube when the same is inflated with air under pressure.

I do not limit myself to the arrangement or the nature of the material used to limit the distention of the sphincter grip-tube while having as free as may be its extension along or parallel to the axis of the tube. Even rubber suitably used—as, for example, in the form of ribs on the inner or even the outer surface of the tube or suitably sheathed in the wall of the tube—may be used for the purpose in view.

Fig. 4 shows part of a pneumatic sphincter grip-tube made of rubber, with a spirally-arranged thread $4^c$ embedded in the wall of the tube.

Fig. 5 shows a division-tire and pneumatic sphincter grip-ring according to my invention secured upon a wheel-rim having a concave periphery and which may be of wood. In this case one edge portion $1^b$ of the tire-ring may be secured, as by cement, to the wheel-rim, while its other edge portion $1^a$ may be held in place on the wheel-rim solely by the sphincter grip-ring 4, or assisted, it may be, by an annular extension $1^\times$, formed on such edge portion and fitting a corresponding annular recess in the wheel-rim 3; or the edge $1^b$ of the tire-ring instead of being cemented to the wheel-rim may be provided with an annular extension like $1^\times$ to take into an annular groove in the wheel-rim.

In the arrangement shown in Fig. 3 the air-valve 5 for the sphincter grip-ring 4 passes through the division 6 between the edges of the tire-ring, which may be suitably notched for the purpose. In Fig. 5 the said air-valve is shown extending through one of the edge portions of the tire-ring, the air-valve 2 for the tire-ring passing through the other edge portion of the said ring. Fig. 6 shows a modification in which the sphincter grip-ring 4 is connected to the air-valve 5 by a short length of tubing 7, which passes in an air-tight manner through the thickened part $1^b$ of the tire-ring and permits of the said sphincter grip-ring making a close joint with the edge portions of the tire-ring without any liability of such joint being impaired by reason of the air-valve tube being jointed to the under surface or inner periphery of the sphincter grip-ring.

Fig. 7 shows my pneumatic sphincter grip-ring applied to a tire having overlapping edges $1^c$ $1^d$, secured upon a wood rim $3^a$, having a concave periphery.

Figs. 8 and 9 show tires having overlapping edges $1^c$ $1^d$ fitted to a metal wheel-rim having a channel-section, the edge $1^c$ being thickened to fit the channel in the wheel-rim.

In the case of tires having overlapped edges, as shown in Figs. 7, 8, and 9, and which I call for distinction "lapped" tires I generally find it sufficient to let the pneumatic sphincter grip-ring 4 collapse around the lapped parts, as shown at $4^b$ in Fig. 7, to hold the lap-joint tight; but I sometimes arrange the said sphincter grip-ring like that in the division-tire, so that when it is deflated it will collapse over the inner edge of the lap $1^d$, as shown in Figs. 8 and 9.

To release the tire-ring so as to open it up, I deflate the tire-ring, if necessary, and inflate the sphincter grip-ring, and so expand it in diameter until one edge portion of the tire-ring can be conveniently drawn from underneath it.

Fig. 10 shows a modified construction of division-tire, in which the thickened edges $1^a$ $1^b$ of the tire-ring are separated by an annular ring 8, of rubber or other suitable material, arranged within and surrounding the channel in the wheel-rim and through which the air-valve 5 for the pneumatic sphincter grip-ring can be conveniently passed.

When using a lapped tire, I sometimes form, as shown in Fig. 11, an annular projection 9 on the outside of the inner lap $1^d$ to fit into an annular recess 10 in the inside of the outer lap $1^c$, the outer lap being provided on its outer side with an annular projection 11, that takes into an annular recess 12 in the wheel-rim 3.

The contractile or centripetal force exercised by the collapsed pneumatic sphincter grip-ring in the case of the lapped tire is sometimes sufficient on a rim having a plain concave section to allow of the projections on the exterior of the tire-ring and the corresponding grooves in the wheel-rim to be dispensed with, as is the case in Fig. 7. The pneumatic sphincter grip-ring 4 may, when suitably expanded in an air-tight manner, be secured, as by cement, either directly or indirectly to the inner surface of one of the edge portions of the tire-ring, so that it will have only to make one joint with the inner surface of the tire-ring. In Fig. 5 the said ring is represented as connected to the inner surface of the tire-ring by a flexible ring of air-tight material, such as rubber. In a division-tire the external surface of the said sphincter grip-ring should be smooth to insure a good joint. In the case of a lapped tire this is not so important.

The inner peripheral portion of the sphincter grip-ring may in some cases be thickened, so as to obviate any irregularity therein that might result from the jointing of the ends of the tube from which the ring is or may be made. This thickening may, as shown in Fig. 12, be produced by means of a supplementary ring 13, of rubber, cemented to the inner periphery of the sphincter grip-ring 4, and it may sometimes have a short annular portion $13^a$, projecting from one or each side thereof, for the better making of the air-tight joint.

The two air-valves 2 and 5 are preferably placed on opposite ends of a diameter of the rim, so as to balance each other. The air-valve 2 should, as a rule, have its inner opening so arranged that it will be free from the pneumatic sphincter grip-ring 4 when this ring is deflated, but in some cases I may use the said sphincter grip-ring itself as a valve, for which purpose the opening of the air-valve 2 may be arranged to come under it, as shown in Fig. 5.

As will be obvious, I do not limit myself to the use of a single inflatable sphincter grip-ring acting in the manner described in a pneumatic tire, as in some cases two or more such rings may be used to make the joint at the inner periphery of the tire ring or cover and secure the same upon a wheel-rim.

I am aware that it has heretofore been proposed to use inflatable pneumatic joint-rings within a pneumatic tire for closing the annular joint around the inner periphery thereof, but in all such cases the pneumatic joint-rings have been of a greater diameter normally or when deflated than the inner periphery of the tire and have acted to close the joint in such periphery only by the radial inward expansion of the ring caused by inflation. Such a joint-ring, which I do not claim as coming within the scope of my invention, is obviously directly opposite, both in construction and operation, to my sphincter grip-ring, which when deflated and off the wheel is of less diameter than the inner periphery of the tire the joint in which it is to close, is inflated only to allow of its being put around the said joint, and acts to close such joint only when more or less deflated, when it exerts a sphincter-like or contractile action around the joint in the tire.

What I claim is—

1. The combination with a pneumatic tire and a wheel-rim upon which said tire is seated, of a hollow inflatable sphincter grip-ring located within said tire-ring and adapted when deflated to exert a contractile action around and upon the inner peripheral portion of said tire and hold the same upon said wheel-rim.

2. The combination with a pneumatic tire comprising a hollow ring having an annular joint at its inner periphery, and a wheel-rim upon which the said tire is seated, of a hollow or tubular pneumatic sphincter grip-ring capable of being increased in diameter by inflation and decreased in diameter by deflation, said rim being located within said tire-ring and acting when deflated to close the said annular joint in said tire-ring.

3. The combination of a hollow inflatable tire divided longitudinally at its inner periphery and having its edges overlapping one another, a wheel-rim upon which the overlapped edges are seated, and a hollow or tubular pneumatic sphincter grip-ring located within said tire and adapted, when deflated, to exert a contractile action around and upon the overlapped edges of said tire.

4. The combination of a tire-ring divided at its inner periphery, a pneumatic sphincter grip-ring located within said tire-ring and around its divided inner periphery and adapted to grip said tire-ring by deflation, a wheel-rim upon which said tire-ring is mounted, and air-valves by which each of said rings can be separately inflated with air under pressure and deflated, substantially as described.

5. The combination of a hollow inflatable tire-ring divided longitudinally at its inner periphery, a wheel-rim upon which said tire-ring is seated, a hollow or tubular pneumatic sphincter grip-ring located within said tire-ring and having a contractile action, produced by deflation of said grip-ring around and upon the divided inner periphery of said tire-ring but made of smaller cross-section than that of the tire-ring, an air-valve, and a flexible pipe connecting said air-valve with the outer peripheral surface of said pneumatic sphincter grip-ring, substantially as described.

6. The combination of a hollow inflatable tire-ring divided longitudinally at its inner periphery and having its edges overlapping one another, a wheel-rim upon which the overlapped edges are seated, a hollow or tubular pneumatic sphincter grip-ring located within said tire-ring and having a contractile action, produced by deflation of said grip-ring around and upon the overlapped edges, and made of smaller cross-section than that of the interior of the tire-ring, a fixed air-valve, and a flexible air-pipe connecting said air-valve with the outer periphery of said joint sphincter grip-ring, substantially as described.

7. The combination of a hollow inflatable tire-ring divided longitudinally at its inner periphery, a wheel-rim upon which said tire-ring is seated, and a hollow or tubular pneumatic sphincter grip-ring located within said tire-ring and having a contractile action, produced by deflation around and upon the divided inner periphery of said tire-ring, the tube of said sphincter grip-ring being capable of extension along its axis but only of limited circumferential expansion, or distention substantially as described for the purpose specified.

8. The combination of a hollow inflatable tire-ring divided longitudinally at its inner periphery and having its edges overlapping and interlocked with one another, a wheel-rim upon which said overlapped and interlocked edges are seated, and a hollow or tubular pneumatic sphincter grip-ring located within said tire-ring and having a contractile action around and upon the overlapped edges and produced by deflation of said ring, said sphincter grip-ring being made of smaller cross-section than that of the interior of the tire-ring and provided with an air-valve, substantially as described.

9. The combination of a hollow inflatable tire-ring having an annular joint at its inner periphery, a wheel-rim upon which said ring is seated, a hollow or tubular pneumatic sphincter grip-ring arranged within said tire-ring and having a contractile action, produced by deflation, around and upon the divided inner periphery of said tire-ring, and a supplementary ring secured to the inner periphery of said sphincter grip-ring substantially as described for the purpose specified.

10. The combination of a hollow inflatable tire-ring having an annular joint at its inner periphery, a wheel-rim upon which said tire-ring is mounted and an inflatable sphincter grip-ring located within said tire-ring and acting around and upon said annular joint when deflated, said sphincter grip-ring being connected in an air-tight manner to the inner surface of one of the sides of said tire-ring, and having a diameter less normally than the inner periphery of said tire-ring, substantially as described for the purpose specified.

11. The combination of a hollow inflatable tire-ring having an annular joint at its inner periphery, a wheel-rim upon which said tire-ring is mounted, a hollow or tubular pneumatic sphincter grip-ring located within said tire-ring and acting around and upon said joint when deflated, and an air-tight band secured to said sphincter grip-tube and to the inner surface of one of the sides of said tire-ring, substantially as described.

In testimony whereof I have singed my name to this specification in the presence of two subscribing witnesses.

FRANK WYNNE.

Witnesses:
PERCY E. MATTOCKS,
WM. O. BROWN.